(12) United States Patent
Winter et al.

(10) Patent No.: US 12,337,961 B1
(45) Date of Patent: Jun. 24, 2025

(54) MONITORING AND ADJUSTING AIRFOILS OF AN AIRCRAFT PROPULSION SYSTEM

(71) Applicant: Raytheon Technologies Corporation, Farmington, CT (US)

(72) Inventors: Michael Winter, New Haven, CT (US); Carroll V. Sidwell, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 105 days.

(21) Appl. No.: 18/106,279

(22) Filed: Feb. 6, 2023

Related U.S. Application Data

(60) Provisional application No. 63/306,723, filed on Feb. 4, 2022.

(51) Int. Cl.
*B64C 3/38* (2006.01)
*B64C 13/38* (2006.01)
*B64D 27/10* (2006.01)

(52) U.S. Cl.
CPC ............... *B64C 3/38* (2013.01); *B64C 13/38* (2013.01); *B64D 27/10* (2013.01)

(58) Field of Classification Search
CPC ............ B64C 3/38; B64C 13/38; B64D 27/10
See application file for complete search history.

(56) References Cited

U.S. PATENT DOCUMENTS

| 8,401,716 | B2 * | 3/2013 | Ciholas | B64C 9/10 |
| | | | | 244/76 R |
| 9,926,937 | B2 | 3/2018 | Tourin | |
| 11,281,237 | B1 * | 3/2022 | Giroux | B64C 13/50 |
| 11,427,305 | B1 * | 8/2022 | Wiegman | B64C 13/16 |
| 2011/0262273 | A1 | 10/2011 | Behnisch | |
| 2019/0308718 | A1 * | 10/2019 | Jones | F15B 15/26 |
| 2021/0316842 | A1 * | 10/2021 | Walker | B64C 13/34 |

FOREIGN PATENT DOCUMENTS

| AU | 2021102090 A4 | 6/2021 |
| FR | 3101417 B1 | 9/2021 |

* cited by examiner

*Primary Examiner* — Valentina Xavier
(74) *Attorney, Agent, or Firm* — Getz Balich LLC

(57) ABSTRACT

An assembly is provided for an aircraft propulsion system. This aircraft propulsion system assembly includes a plurality of upstream airfoils, a plurality of downstream airfoils, a sensor, an actuator and a controller. The upstream airfoils include a first upstream airfoil. The downstream airfoils are arranged downstream of and adjacent the upstream airfoils. The downstream airfoils include a first downstream airfoil. The sensor is arranged with the first upstream airfoil. The sensor is configured to provide sensor data indicative of a parameter for the first upstream airfoil. The actuator is coupled to the first downstream airfoil. The controller is configured to signal the actuator to move the first downstream airfoil based on the sensor data.

20 Claims, 7 Drawing Sheets

MONITORING AND ADJUSTING AIRFOILS OF AN AIRCRAFT PROPULSION SYSTEM

This application claims priority to U.S. Patent Appln. No. 63/306,723 filed Feb. 4, 2022 which is hereby incorporated herein by reference in its entirety.

BACKGROUND OF THE DISCLOSURE

1. Technical Field

This disclosure relates generally to an aircraft propulsion system and, more particularly, to monitoring and adjusting propulsion system airfoils.

2. Background Information

An aircraft propulsion system may include one or more sets of variable pitch airfoils. Various systems and methods are known in the art for monitoring airfoil properties. Various other systems and method are known in the art for adjusting airfoil pitch. While these known systems and methods have various benefits, there is still room in the art for improvement.

SUMMARY OF THE DISCLOSURE

According to an aspect of the present disclosure, an assembly is provided for an aircraft propulsion system. This aircraft propulsion system assembly includes a plurality of upstream airfoils, a plurality of downstream airfoils, a sensor, an actuator and a controller. The upstream airfoils include a first upstream airfoil. The downstream airfoils are arranged downstream of and adjacent the upstream airfoils. The downstream airfoils include a first downstream airfoil. The sensor is arranged with the first upstream airfoil. The sensor is configured to provide sensor data indicative of a parameter for the first upstream airfoil. The actuator is coupled to the first downstream airfoil. The controller is configured to signal the actuator to move the first downstream airfoil based on the sensor data.

According to another aspect of the present disclosure, a propulsion system is provided for an aircraft. This aircraft propulsion system includes an open rotor turbine engine and a sensor system. The open rotor turbine engine includes an array of open upstream airfoils and an array of open downstream airfoils adjacent and downstream of the array of open upstream airfoils along a flowpath. The array of open upstream airfoils includes a first open upstream airfoil. The array of open downstream airfoils includes a first open downstream airfoil. The sensor system includes an upstream sensor and a downstream sensor. The upstream sensor is embedded within fiber-reinforced composite material of the first open upstream airfoil. The downstream sensor is embedded within fiber-reinforced composite material of the first open downstream airfoil.

According to still another aspect of the present disclosure, a method is provided during which a gas turbine engine is provided. This gas turbine engine includes a plurality of upstream airfoils and a plurality of downstream airfoils adjacent and downstream of the upstream airfoils along a flowpath. The upstream airfoils include a first upstream airfoil. The downstream airfoils include a first downstream airfoil. Sensor data is output from a sensor embedded within the first upstream airfoil. The sensor data is indicative of a structural parameter for the first upstream airfoil. Pitch of the first downstream airfoil is adjusted based on the sensor data.

The open rotor turbine engine may also include an open propulsor rotor and an open stator vane array. The open propulsor rotor may include the array of open upstream airfoils. The open stator vane array may include the array of open downstream airfoils.

The upstream sensor may be configured to provide upstream sensor data indicative of a structural parameter of the first open upstream airfoil. The downstream sensor may be configured to provide downstream sensor data indicative of a structural parameter of the first open downstream airfoil. The sensor system may be configured to process the upstream sensor data and the downstream sensor data to determine presence of an anomaly.

An actuation system may also be included. This actuation system may be configured to change pitch of the first open upstream airfoil and/or the first open downstream airfoil based on sensor data from the upstream sensor and/or the downstream sensor.

The actuator may be configured to pivot the first downstream airfoil about a pivot axis.

The actuator may be configured to change pitch of the first downstream airfoil.

The controller may be configured to signal the actuator to move the first downstream airfoil based on the sensor data to change aerodynamic loading on one or more of the upstream airfoils.

The controller may be configured to signal the actuator to move the first downstream airfoil based on the sensor data to reduce vibrations in one or more of the upstream airfoils.

The parameter may be a structural parameter of the first upstream airfoil.

An upstream actuator may be included and coupled to the first upstream airfoil. The controller may also be configured to signal the upstream actuator to move the first upstream airfoil based on the sensor data.

The sensor may be embedded within material of the first upstream airfoil.

The material of the first upstream airfoil may be or otherwise include fiber-reinforced composite material.

A downstream sensor may be included and arranged with the first downstream airfoil. The downstream sensor may be configured to provide downstream sensor data indicative of a parameter for the first downstream airfoil. The controller may be configured to signal the actuator to move the first downstream airfoil based on the sensor data and the downstream sensor data.

A rotor may be included and configured to rotate about a rotational axis. The rotor may include the upstream airfoils. The rotor may be configured as or otherwise include an open propulsor rotor.

An engine core may be included, and the engine core may include a combustor and a turbine fluidly coupled with and downstream of the combustor. The turbine may include a turbine rotor configured to drive rotation of the rotor.

A stator vane array may be included, and the stator vane array may include the downstream airfoils.

The stator vane array may be configured as or otherwise include an open stator vane array.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
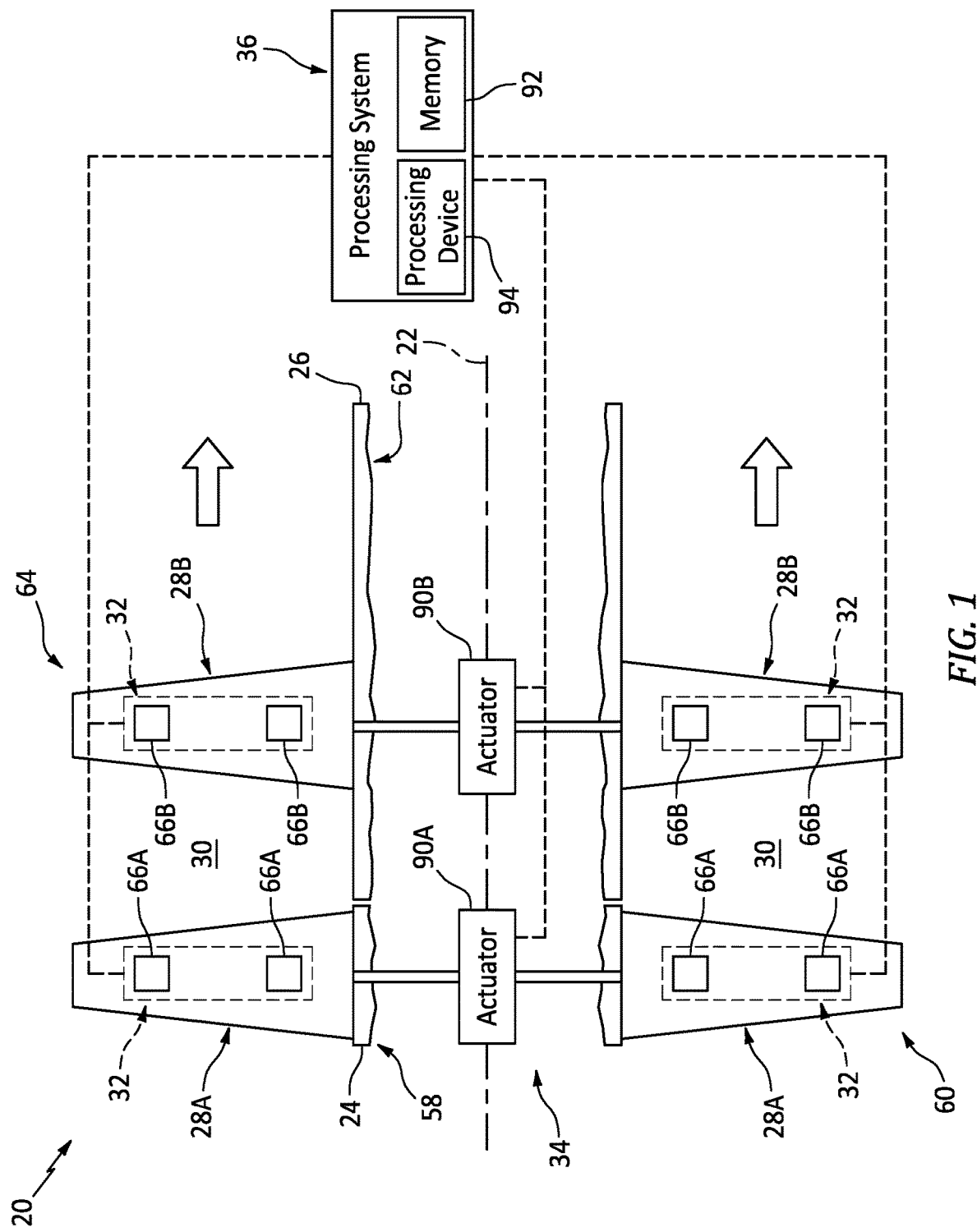
FIG. 1 is a side schematic illustration of an assembly for an aircraft propulsion system.

FIG. 1 illustrates an assembly 20 for an aircraft propulsion system. This propulsion system assembly 20 extends axially along a rotational axis 22 between a forward, upstream end 24 and an aft, downstream end 26, which rotational axis 22 may also be an axial centerline of the aircraft propulsion system and its assembly 20. The propulsion system assembly 20 includes a plurality of upstream airfoils 28A and a plurality of downstream airfoils 28B located axially adjacent (e.g., directly neighboring) and downstream of the upstream airfoils 28A along a flowpath 30 of the aircraft propulsion system. The propulsion system assembly 20 also includes a sensor system 32, an actuation system 34 and a processing system 36 (e.g., a controller).

Figure 3:
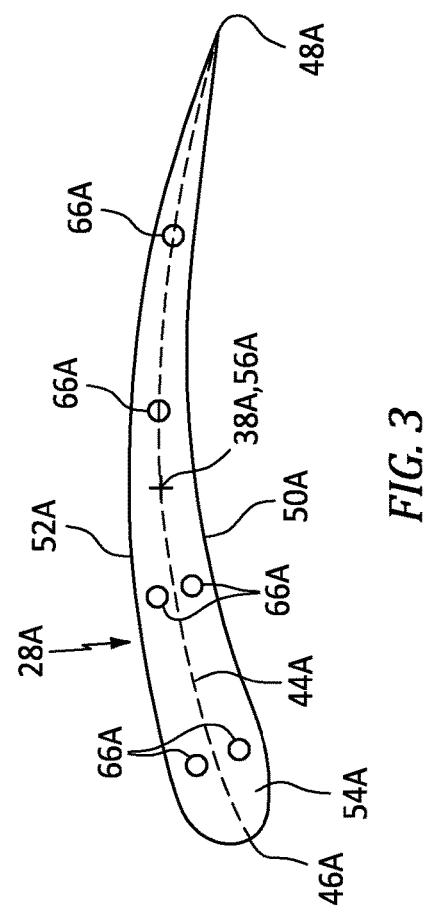
FIG. 3 is a sectional schematic illustration of the upstream airfoil.
Figure 2:
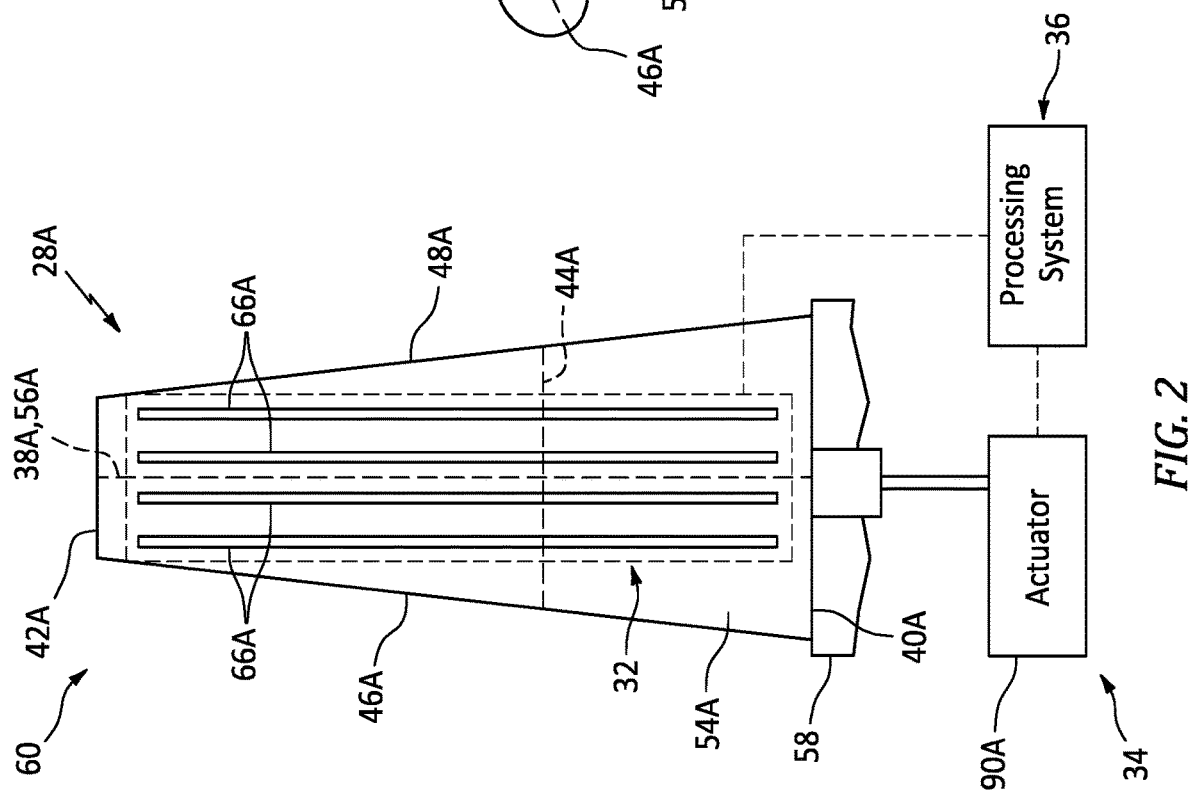
FIG. 2 is a side schematic illustration of a portion of the propulsion system assembly with an upstream airfoil.

The upstream airfoils 28A are distributed circumferentially about the rotational axis 22 in an annular array. Referring to FIG. 2, each of the upstream airfoils 28A extends spanwise (e.g., radially) along a span 38A of the respective upstream airfoil 28A from a base 40A of the respective upstream airfoil 28A to a (e.g., unshrouded) tip 42A of the respective upstream airfoil 28A. Each of the upstream airfoils 28A extends longitudinally along a camber line 44A of the respective upstream airfoil 28A between and to a leading edge 46A of the respective upstream airfoil 28A and a trailing edge 48A of the respective upstream airfoil 28A. Referring to FIG. 3, each of the respective upstream airfoils 28A extends laterally (e.g., widthwise) between and to a first (e.g., concave and/or pressure) side 50A of the respective upstream airfoil 28A and a second (e.g., convex and/or suction) side 52A of the respective upstream airfoil 28A. Each of these upstream airfoil sides 50A and 52A extends longitudinally between and may meet at the upstream airfoil leading edge 46A and the upstream airfoil trailing edge 48A.

Each of the upstream airfoils 28A of FIGS. 2 and 3 may be configured as a composite airfoil. A body 54A of each upstream airfoil 28A, for example, may be constructed from a fiber-reinforced composite; e.g., a fiber-reinforced polymer. This fiber-reinforced composite may include reinforcement material embedded within a matrix. The reinforcement material may at least (or only) include fiberglass fibers, carbon fibers, aramid fibers and/or a combination of any one or more of the foregoing reinforcement material fibers. The matrix may be formed from a polymer such as, but not limited to, a thermoset epoxy. The present disclosure, however, is not limited to the foregoing exemplary reinforcement or matrix materials.

Each upstream airfoil 28A may be configured as a variable pitch airfoil. Each upstream airfoil 28A of FIGS. 2 and 3, for example, is configured to pivot about a respective (e.g., radial) upstream airfoil pivot axis 56A, which upstream airfoil pivot axis 56A is angularly offset from (e.g., perpendicular to and/or coincident with) the rotational axis 22 (see FIG. 1). Referring to FIG. 1, these upstream airfoils 28A may also be configured as propulsor blades; e.g., variable pitch propulsor blades. The upstream airfoils 28A of FIG. 1, for example, are arranged circumferentially about and pivotally connected to a rotor disk 58. The upstream airfoils 28A and the rotor disk 58 may thereby form, or may otherwise be included in, a propulsor rotor 60. Examples of the propulsor rotor 60 include, but are not limited to, a fan rotor for a ducted fan engine (e.g., a turbofan engine) and an open rotor for an open rotor engine (e.g., a pusher fan engine, an open tractor rotor engine, etc.). The upstream airfoils 28A, however, are not limited to such exemplary propulsor rotor configurations nor to such exemplary engine configurations. Furthermore, one or more or all of the upstream airfoils 28A/propulsor blades may alternatively each be configured as a fixed pitch airfoil/propulsor blade.

Figure 5:
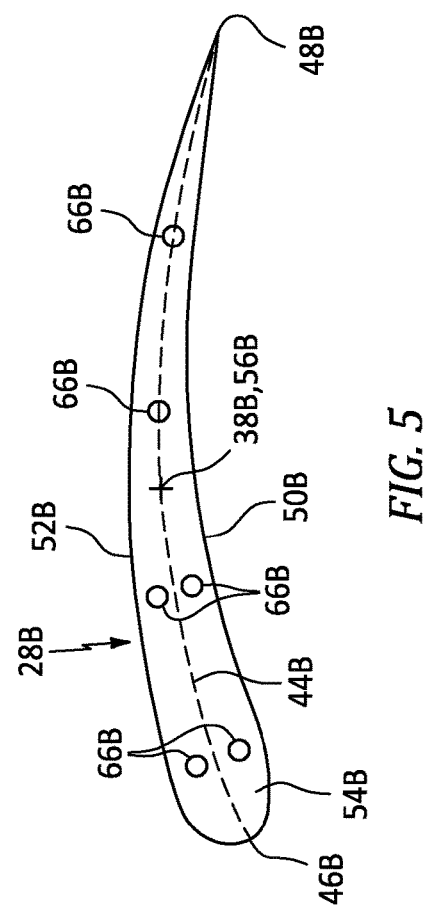
FIG. 5 is a sectional schematic illustration of the downstream airfoil.
Figure 4:
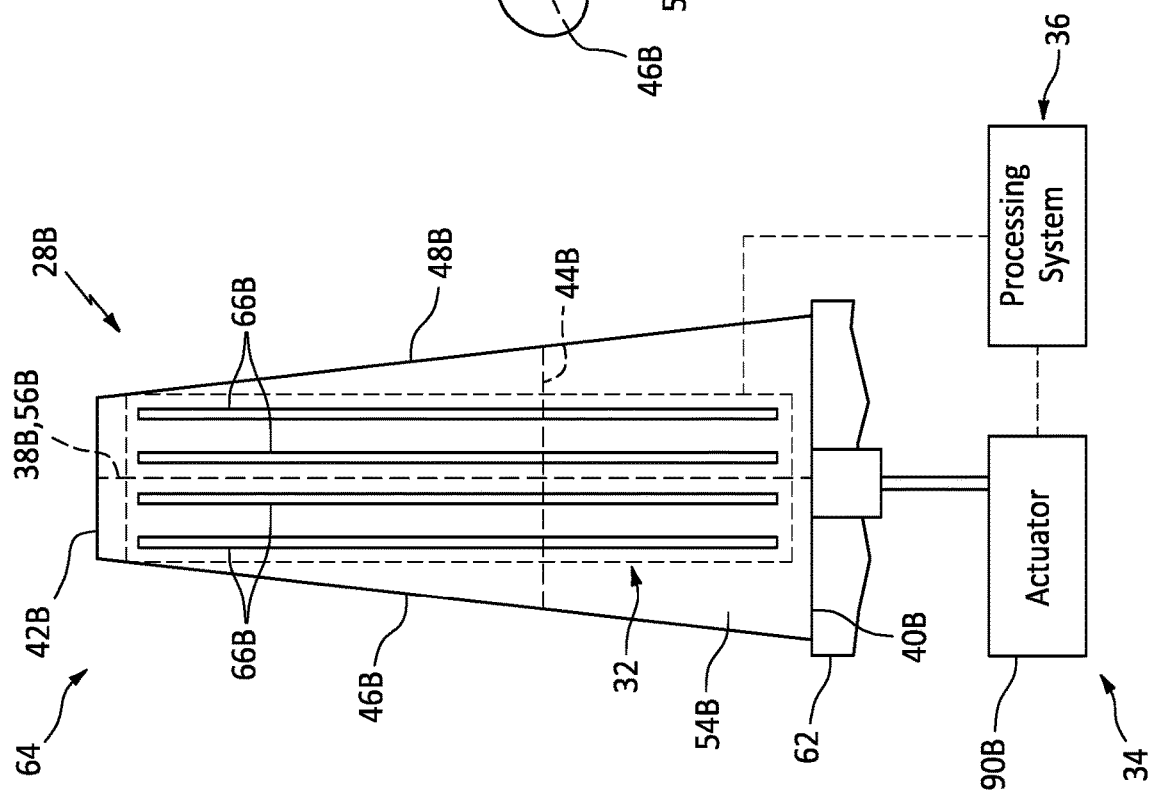
FIG. 4 is a side schematic illustration of a portion of the propulsion system assembly with a downstream airfoil.

The downstream airfoils 28B are distributed circumferentially about the rotational axis 22 in an annular array. Referring to FIG. 4, each of the downstream airfoils 28B extends spanwise (e.g., radially) along a span 38B of the respective downstream airfoil 28B from a base 40B of the respective downstream airfoil 28B to a (e.g., unshrouded, unsupported) tip 42B of the respective downstream airfoil 28B. Each of the downstream airfoils 28B extends longitudinally along a camber line 44B of the respective downstream airfoil 28B between and to a leading edge 46B of the respective downstream airfoil 28B and a trailing edge 48B of the respective downstream airfoil 28B. Referring to FIG. 5, each of the respective downstream airfoils 28B extends laterally (e.g., widthwise) between and to a first (e.g., concave and/or pressure) side 50B of the respective downstream airfoil 28B and a second (e.g., convex and/or suction) side 52B of the respective downstream airfoil 28B. Each of these downstream airfoil sides 50B and 52B extends longitudinally between and may meet at the downstream airfoil leading edge 46B and the downstream airfoil trailing edge 48B.

Each of the downstream airfoils 28B of FIGS. 4 and 5 may be configured as a composite airfoil. A body 54B of each downstream airfoil 28B, for example, may be constructed from a fiber-reinforced composite (e.g., a fiber-reinforced polymer), which may be the same as or different than the fiber-reinforced composite for the upstream airfoils 28A. The fiber-reinforced composite for the downstream airfoils 28B may include reinforcement material embedded within a matrix. The reinforcement material may at least (or only) include fiberglass fibers, carbon fibers, aramid fibers and/or a combination of any one or more of the foregoing reinforcement material fibers. The matrix may be formed from a polymer such as, but not limited to, a thermoset epoxy. The present disclosure, however, is not limited to the foregoing exemplary reinforcement or matrix materials.

Each downstream airfoil 28B may be configured as a variable pitch airfoil. Each downstream airfoil 28B of FIGS. 4 and 5, for example, is configured to pivot about a respective (e.g., radial) downstream airfoil pivot axis 56B, which downstream airfoil pivot axis 56B is angularly offset from (e.g., perpendicular to and/or coincident with) the rotational axis 22 (see FIG. 1). Referring to FIG. 1, these downstream airfoils 28B may also be configured as stator vanes; e.g., variable pitch stator vanes. The downstream airfoils 28B of FIG. 1, for example, are arranged circumferentially about and pivotally connected to at least an inner support structure 62; e.g., an engine case, a platform, a nacelle, etc. The downstream airfoils 28B and the inner support structure 62 may thereby form, or may otherwise be included in, a stator vane array 64; e.g., a variable pitch stator vane array. Examples of the stator vane array 64 include, but are not limited to, a fan exit guide vane array for the ducted fan engine (e.g., the turbofan engine) and an open guide vane array for the open rotor engine (e.g., the pushed fan engine, the open tractor rotor engine, etc.). The downstream airfoils 28B, however, are not limited to such exemplary stator vane array configurations nor to such exemplary engine configurations. Furthermore, one or more or all of the downstream airfoils 28B/stator vanes may alternatively each be configured as a fixed pitch airfoil/stator vane. The downstream airfoils 28B are also not limited to stator vane array applications. The (e.g., variable or fixed) downstream airfoils 28B, for example, may alternatively be included in a downstream rotor for the aircraft propulsion system; e.g., a second propulsor rotor.

The sensor system 32 of FIG. 1 includes one or more sensors. These sensors may include one or more upstream airfoil sensors 66A (referred to below as upstream sensors) and/or one or more downstream airfoil sensors 66B (referred to below as downstream sensors).

Figure 6B:
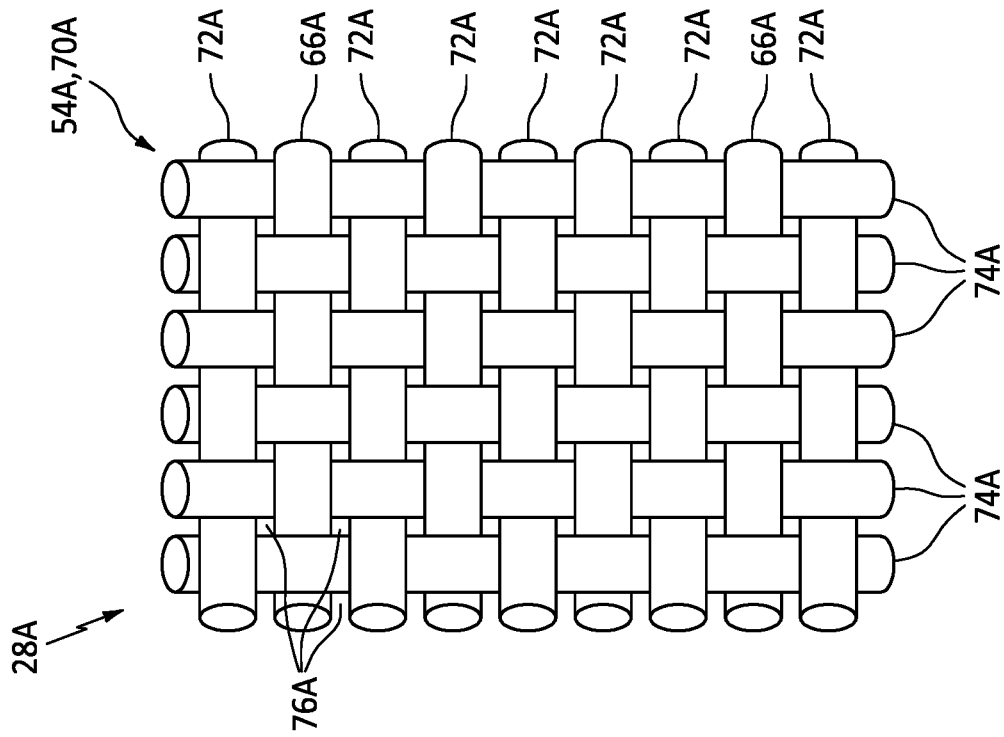
FIGS. 6A and 6B are schematic illustrations of various arrangements for disposing sensors in a body of the upstream airfoil.
Figure 6A:
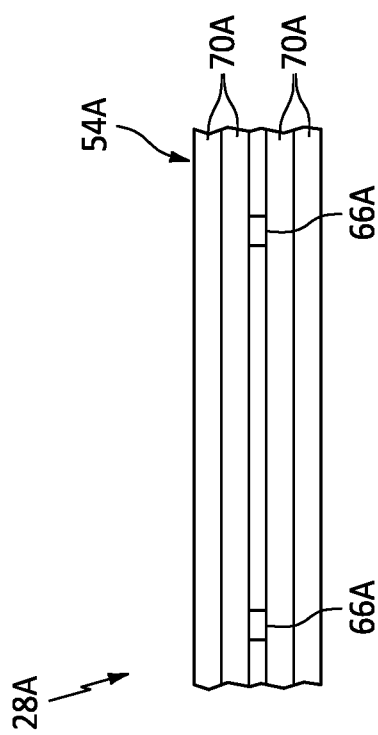

The upstream sensors 66A are arranged with one or more or all of the upstream airfoils 28A. For example, referring to FIGS. 2 and 3, each upstream airfoil 28A may be configured with/include a respective set of one or more of the upstream sensors 66A. Each of these upstream sensors 66A may be disposed within the upstream airfoil 28A and its body 54A. More particularly, each upstream sensor 66A may be embedded into material (e.g., the fiber-reinforced composite) forming the respective upstream airfoil 28A and its body 54A. The upstream sensors 66A of FIG. 6A, for example, are disposed between and bonded to adjacent layers 70A of the upstream airfoil material. The upstream sensors 66A of FIG. 6B, by contrast, are integrated into at least one of the layers 70A of the upstream airfoil material. The upstream sensors 66A of FIG. 6B, for example, may be woven with fiber reinforcement fibers 72A and 74A into a weave to provide a reinforcement material cloth, where the reinforcement material cloth is impregnated with/embedded within the matrix 76A. The present disclosure, however, is not limited to the foregoing exemplary upstream sensor-upstream airfoil arrangements.

Referring to FIG. 1, each of the upstream sensors 66A is configured to provide upstream airfoil sensor data (referred to below as upstream sensor data) indicative of at least one (e.g., structural) parameter of the respective upstream airfoil 28A. Examples of the parameter include, but are not limited to, internal stress within the respective upstream airfoil 28A, internal strain within the respective upstream airfoil 28A, deflection of the respective upstream airfoil 28A, vibration within the respective upstream airfoil 28A, and presence of a fracture in the respective upstream airfoil 28A.

Figure 7B:
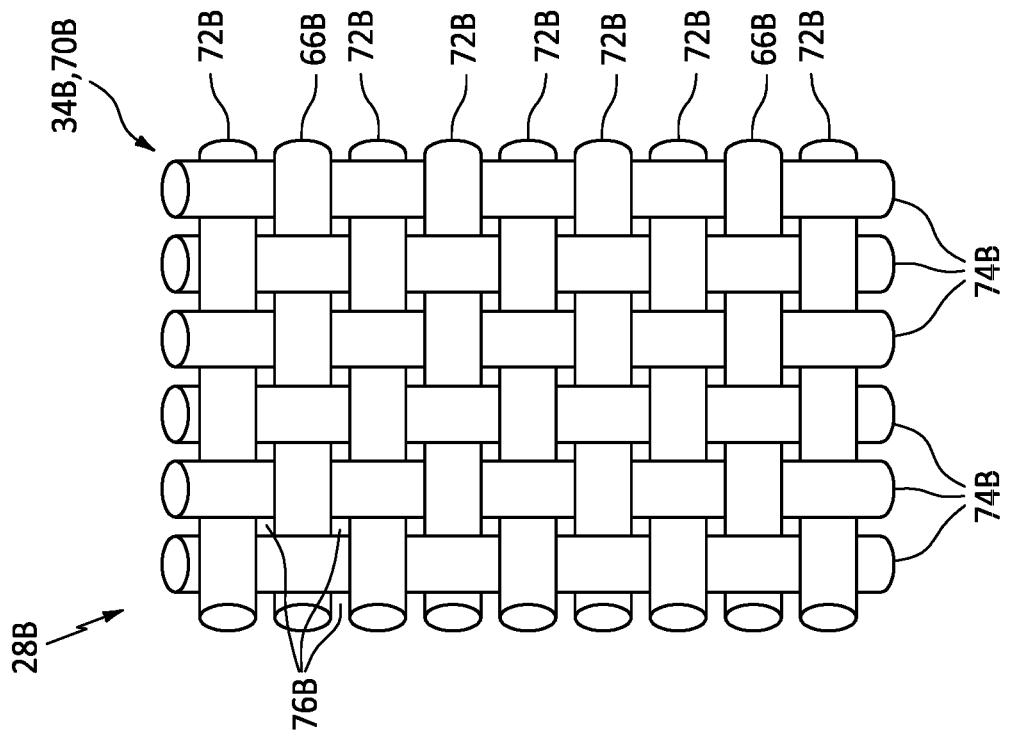
FIGS. 7A and 7B are schematic illustrations of various arrangements for disposing sensors in a body of the downstream airfoil.
Figure 7A:
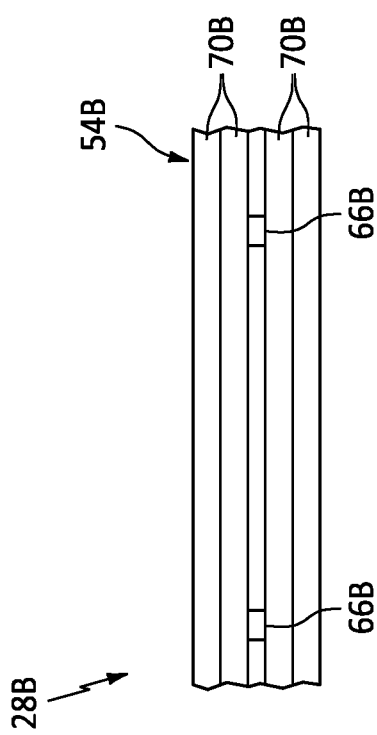

The downstream sensors 66B are arranged with one or more or all of the downstream airfoils 28B. For example, referring to FIGS. 4 and 5, each downstream airfoil 28B may be configured with/include a respective set of one or more of the downstream sensors 66B. Each of these downstream sensors 66B may be disposed within the downstream airfoil 28B and its body 54B. More particularly, each downstream sensor 66B may be embedded into material (e.g., the fiber-reinforced composite) forming the respective downstream airfoil 28B and its body 54B. The downstream sensors 66B of FIG. 7A, for example, are disposed between and bonded to adjacent layers 70B of the downstream airfoil material. The downstream sensors 66B of FIG. 7B, by contrast, are integrated into at least one of the layers 70B of the downstream airfoil material. The downstream sensors 66B of FIG. 7B, for example, may be woven with fiber reinforcement fibers 72B and 74B into a weave to provide a reinforcement material cloth, where the reinforcement material cloth is impregnated with/embedded within the matrix 76B. The present disclosure, however, is not limited to the foregoing exemplary downstream sensor-downstream airfoil arrangements.

Referring to FIG. 1, each of the downstream sensors 66B is configured to provide downstream airfoil sensor data (referred to below as downstream sensor data) indicative of at least one (e.g., structural) parameter of the respective downstream airfoil 28B. Examples of the parameter include, but are not limited to, internal stress within the respective downstream airfoil 28B, internal strain within the respective downstream airfoil 28B, deflection of the respective downstream airfoil 28B, vibration within the respective downstream airfoil 28B, and presence of a fracture in the respective downstream airfoil 28B.

One or more or all of the sensors 66A and 66B (generally referred to as 66) may each be configured as or otherwise include an optical sensor. Each sensor 66 of FIG. 8, for example, includes an optical fiber 78 (e.g., a strand of fiber optics), an electromagnetic radiation transmitter 80 and an electromagnetic radiation receiver 82.

At least the optical fiber 78 is arranged (e.g., embedded) within the respective airfoil 28A, 28B (generally referred to as 28) and its body 54A, 54B (generally referred to as 54) as described above; e.g., see FIGS. 6A-7B. The optical fiber 78 of FIG. 8 extends along a longitudinal centerline between a first end 84 of the optical fiber 78 and a second end 86 of the optical fiber 78. The optical fiber 78 is configured with one or more internal gratings 88A-D (generally referred to as 88; schematically shown) (e.g., fiber Bragg gratings (FBG)) within a fiber core of the optical fiber 78. These gratings 88 are arranged (e.g., distributed) at discrete locations along the longitudinal centerline between the fiber first end 84 and the fiber second end 86. Each of the gratings 88 is configured to reflect one or more specific wavelengths of electromagnetic radiation (e.g., light) under an initial set of predetermined conditions while permitting the remaining wavelengths of the electromagnetic radiation to pass/travel therethrough. Each grating 88 may thereby filter the one or more specific wavelengths of electromagnetic radiation. Each of the gratings 88 may be provided by forming a periodic variation in a refractive index of the fiber core of the optical fiber 78; e.g., by constructing a distributed Bragg reflector within a short segment of the optical fiber 78.

Each of the gratings 88 within the optical fiber 78 is tuned for (e.g., configured to reflect/filter) a different wavelength (or wavelengths) of the electromagnetic radiation. The first grating 88A, for example, may be tuned for a first wavelength of the electromagnetic radiation. The second grating 88B may be tuned for a second wavelength of the electromagnetic radiation which is different than the first wavelength of the electromagnetic radiation, and so on. The second wavelength of the electromagnetic radiation may also be separated (e.g., spaced) from the first wavelength of the electromagnetic radiation by one or more intermediate wavelengths of the electromagnetic radiation to provide further differentiation between the different wavelengths of the electromagnetic radiation.

Figure 8:
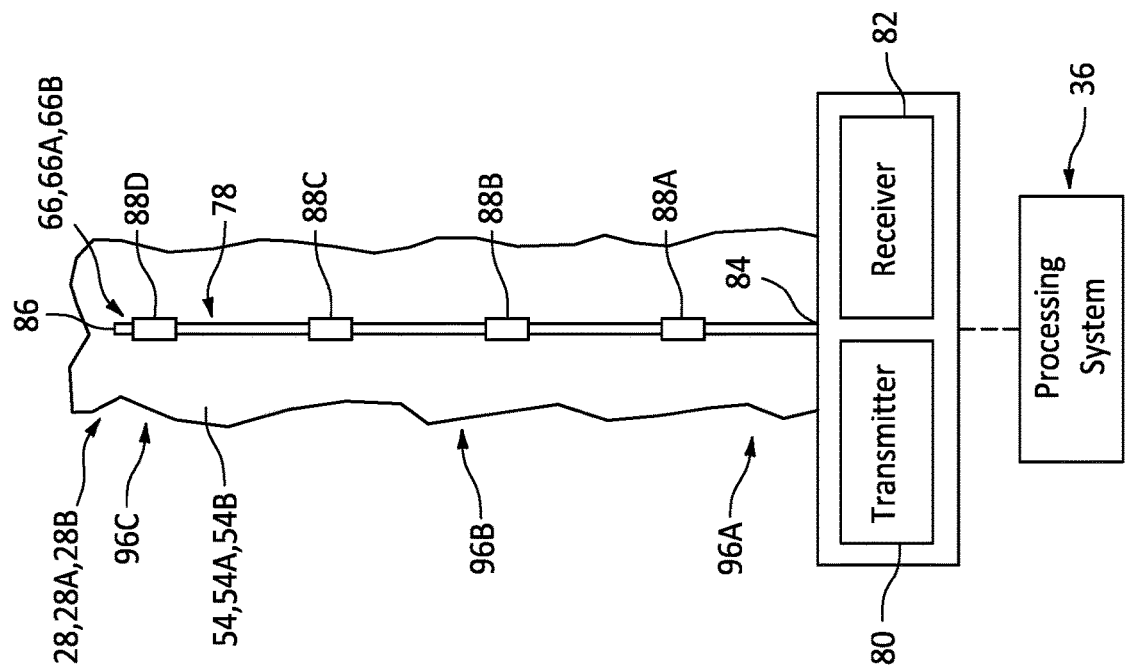
FIG. 8 is a side schematic illustration of a portion of the propulsion system assembly with an optical fiber sensor.

The transmitter 80 is configured transmit one or more wavelengths (e.g., a spectrum) of the electromagnetic radiation into the optical fiber 78. The transmitter 80, for example, may be configured as an electromagnetic radiation emitting device. The transmitter 80 of FIG. 8 is disposed at and/or otherwise in communication (e.g., optically coupled) with the fiber first end 84.

The receiver 82 is configured to receive radiation (e.g., optical) information via electromagnetic radiation received from the optical fiber 78. The receiver 82 is also configured to provide sensor data (e.g., the upstream sensor data or the downstream sensor data) generated from and/or indicative of the radiation information. The receiver 82, for example, may be configured as an optical receptor or any other electromagnetic radiation receptor/sensor. The receiver 82 of FIG. 8 is disposed at and/or otherwise in communication (e.g., optically coupled) with the fiber first end 84. The transmitter 80 and the receiver 82 of FIG. 8, for example, may be configured as a transceiver.

Referring to FIG. 1, the actuation system 34 includes one or more actuators. These actuators may include at least one upstream airfoil actuator 90A (referred to below as upstream actuator) and/or at least one downstream airfoil actuator 90B (referred to below as downstream actuator). The upstream actuator 90A is motively coupled to one or more or all of the upstream airfoils 28A through a linkage (or linkages). The upstream actuator 90A may thereby pivot and change pitch of each respective upstream airfoil 28A about its pivot axis 56A (see FIG. 2). The downstream actuator 90B is motively coupled to one or more or all of the downstream airfoils 28B through a linkage (or linkages). The downstream actuator 90B may thereby pivot and change pitch of each respective downstream airfoil 28B about its pivot axis 56B (see FIG. 4). Each of the actuators 90A and 90B (generally referred to as 90) may be configured as or otherwise include a hydraulic, pneumatic or electric rotary actuator (e.g., a motor, etc.) or linear actuator (e.g., a piston, a lead screw, etc.). The present disclosure, however, is not limited to any particular actuator configurations.

The processing system 36 is in signal communication with the sensor system 32 and the actuation system 34. The processing system 36, for example, may be hardwired and/or wirelessly coupled with one or more or each of the sensors 66 and/or one or more or each of the actuators 90.

The processing system 36 may be implemented with a combination of hardware and software. The hardware may include a memory 92 and at least one processing device 94, which processing device 94 may include one or more single-core and/or multi-core processors. The hardware may also or alternatively include analog and/or digital circuitry other than that described above.

The memory 92 is configured to store software (e.g., program instructions) for execution by the processing device 94, which software execution may control and/or facilitate performance of one or more operations such as those described in the method below. The memory 92 may be a non-transitory computer readable medium. For example, the memory 92 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 9:
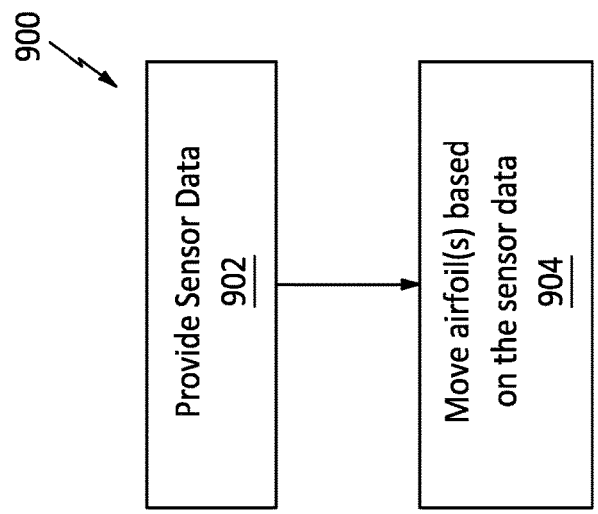
FIG. 9 is a method for operating an aircraft propulsion system.

FIG. 9 is a flow diagram of a method 900 for operating a propulsion system. For ease of description, this operating method 900 is described below with reference to the propulsion system assembly 20 described above. The operating method 900 of the present disclosure, however, is not limited to any particular propulsion system assembly types or configurations.

In step 902, the sensor system 32 provides sensor data to the processing system 36. This sensor data may be or otherwise include the upstream sensor data and/or the downstream sensor data.

The processing system 36 of FIG. 8 may signal the transmitter 80 to emit first electromagnetic radiation into the optical fiber 78. This first electromagnetic radiation travels within the optical fiber 78 and interacts with one or more gratings 88 to provide second electromagnetic radiation (e.g., a second spectrum of light). This second electromagnetic radiation may be different than the first electromagnetic radiation due to interactions with the one or more gratings 88. For example, reflective and/or pass-through properties of one or more of the gratings 88 may change due to deformations to the respective airfoil 28, temperature changes in the respective airfoil 28, etc. In addition or alternatively, stress fractures in the respective airfoil 28 may break an optical path along the optical fiber 78 such that the transmitted electromagnetic radiation may not reach one or more of the gratings 88, which may lead to differences between the first electromagnetic radiation and the second electromagnetic radiation. The receiver 82 detects, captures and/or otherwise receives at least a portion of all of the second electromagnetic radiation. The receiver 82 converts this received second electromagnetic radiation into the respective sensor data, which sensor data is indicative of the one or more (e.g., structural) parameters of the respective airfoil 28. The receiver 82 subsequently outputs the sensor data to the processing system 36.

In step 904, the actuation system 34 moves one or more of the airfoils 28 based on the sensor data. The processing system 36 of FIG. 1, for example, may process the sensor data (e.g., the upstream sensor data and/or the downstream sensor data) to determine one or more loading conditions to which one or more or all of the upstream airfoils 28A and/or one or more or all of the downstream airfoils 28B are subjected. The processing system 36 of FIG. 8, for example, may process the sensor data to determine one or more aerodynamic loading conditions at one or more regions (e.g., a base region 96A, an intermediate region 96B, a tip region 96C, etc.) along the span of each respective airfoil 28. The processing system 36 may also or alternatively process the sensor data to determine one or more dynamic loading conditions (e.g., vibratory modes, etc.) at one or more regions (e.g., the base region 96A, the intermediate region 96B, the tip region 96C, etc.) along the span of each respective airfoil 28. The processing system 36 may also or alternatively process the sensor data to determine a physical condition of each respective airfoil 28 and/or predict future failure.

Based on the determined loading conditions and/or the determined physical condition, the processing system 36 of FIG. 1 may signal the actuation system 34 to move (e.g., pivot, change pitch of) one or more or all of the upstream airfoils 28A and/or one or more or all of the downstream airfoils 28B. This movement may facilitate a reduction, alteration and/or elimination of certain aerodynamic or structural loading conditions. Loading conditions may include aerodynamic pressure loading, dynamic structural loading (e.g., vibratory excitation), and/or static structural lading. The upstream airfoils 28A and/or the downstream airfoils 28B, for example, may be moved (e.g., adjusted) to reduce and/or move aerodynamic and/or structural loading on one or more or all of the upstream airfoils 28A and/or one or more or all of the downstream airfoils 28B. For example, the pitch of the downstream airfoils 28B may be adjusted to alter the aerodynamic loading on the upstream airfoils 28A, and/or vice versa. The pitch of the downstream airfoils 28B may also or alternatively be adjusted to reduce vibrations within those downstream airfoils 28B and/or the upstream airfoils 28A, and/or vice versa. The processing system 36 may thereby alter loading conditions on one or more or all of the upstream airfoils 28A and/or one or more or all of the downstream airfoils 28B in response to determining one or more structural parameters for one or more or all of the upstream airfoils 28A and/or one or more or all of the downstream airfoils 28B.

The processing system 36 of FIG. 1 may also adjust pitch of one or more or all of the upstream airfoils 28A and/or one or more or all of the downstream airfoils 28B to reduce potential rapid future degradation of one or more or all of the upstream airfoils 28A and/or one or more or all of the downstream airfoils 28B. For example, where the processing system 36 detects or predicts damage in a respective airfoil 28, the processing system 36 may signal the actuation system 34 to adjust pitch of that airfoil 28 and/or one or more or all of the other airfoils 28 to reduce loading on the damaged airfoil. The processing system 36 may also communicate the detected and/or predicted damage to a flight crew (e.g., a pilot) and/or to a ground crew (e.g., maintenance personnel).

In some embodiments, the processing system 36 may compare the sensor data between the upstream sensors 66A for some or all of the upstream airfoils 28A to determine presence of anomalies between the respective upstream airfoils 28A and/or the respective upstream sensors 66A. The processing system 36 may also or alternatively compare the sensor data between the downstream sensors 66B for some or all of the downstream airfoils 28B to determine presence of anomalies between the respective downstream airfoils 28B and/or the respective downstream sensors 66B. The processing system 36 may also or alternatively compare the sensor data between one or more or all of the upstream sensors 66A for one or more or all of the upstream airfoils 28A and one or more or all of the downstream sensors 66B for one or more or all of the downstream airfoils 28B to determine presence of anomalies between the respective airfoils 28 and/or the respective sensors 66. When certain anomalies are present, the processing system 36 may determine that one or more of the airfoils 28 is damaged and/or one or more of the sensors 66 is outputting erroneous data.

Figure 10:
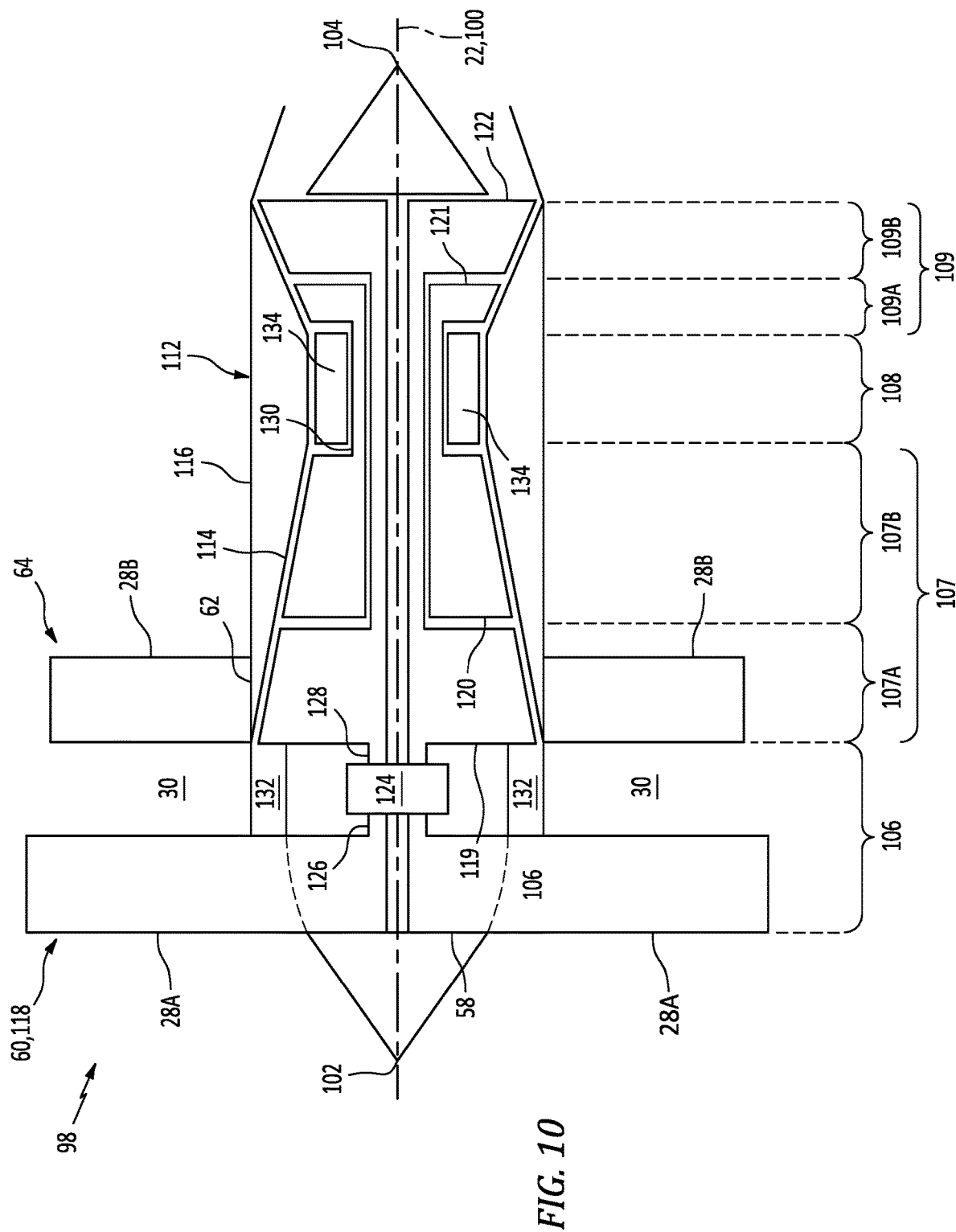
FIG. 10 is a side schematic illustration of an open rotor aircraft propulsion system.

Various types of aircraft propulsion systems may be configured with the propulsion system assembly 20. An example of such an aircraft propulsion system is shown in FIG. 10, which propulsion system is configured as an open rotor aircraft propulsion system 98 with a tractor propulsor. This propulsion system 98 of FIG. 10 extends axially along an axial centerline 100 (e.g., the rotational axis 22) between a forward, upstream end 102 and an aft, downstream end 104. The propulsion system 98 includes a gas turbine engine with a propulsor (e.g., an un-ducted fan) section 106, a compressor section 107, a combustor section 108 and a turbine section 109. The compressor section 107 of FIG. 10 includes a low pressure compressor (LPC) section 107A and a high pressure compressor (HPC) section 107B. The turbine section 109 of FIG. 10 includes a high pressure turbine (HPT) section 109A and a low pressure turbine (LPT) section 109B.

The engine sections 106-109B are arranged sequentially along the axial centerline 100 between the propulsion system upstream end 102 and the propulsion system downstream end 104. The propulsor section 106 is configured outside of an engine housing 112 at an exterior of the propulsion system 98. The engine sections 107A-109B are arranged within the engine housing 112. This engine housing 112 includes a case 114 and a nacelle 116. The case 114 houses one or more of the engine sections 107A-109B; e.g., an engine core. The nacelle 116 houses and provides an aerodynamic cover for the case 114.

Each of the engine sections 106, 107A, 107B, 109A and 109B includes a respective bladed rotor 118-122. Each of these bladed rotors 118-120 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The propulsor rotor 60 (see also FIG. 1) may be configured as the open propulsor rotor 118 of FIG. 10. The stator vane array 64 (see also FIG. 1) may be arranged outside of the engine housing 112 and downstream of the propulsor section 106.

The propulsor rotor 118 is connected to a geartrain 124, for example, through a propulsor shaft 126. The geartrain 124 and the LPC rotor 119 are connected to and driven by the LPT rotor 122 through a low speed shaft 128. The HPC rotor 120 is connected to and driven by the HPT rotor 121 through a high speed shaft 130.

During operation, an inner stream of air propelled by the propulsor rotor 118 enters a core flowpath 132 within the aircraft propulsion system 98. This core flowpath 132 extends sequentially through the engine sections 107A-109B. The air within the core flowpath 132 may be referred to as core air. This core air is compressed by the LPC rotor 119 and the HPC rotor 120 and directed into a combustion chamber 134 of a combustor in the combustor section 108. Fuel is injected into the combustion chamber 134 and mixed with the compressed core air to provide a fuel-air mixture. This fuel-air mixture is ignited and combustion products thereof flow through and sequentially cause the HPT rotor 121 and the LPT rotor 122 to rotate. The rotation of the HPT rotor 121 and the LPT rotor 122 respectively drive rotation of the HPC rotor 120 and the LPC rotor 119 and, thus, compression of the air received from a core airflow inlet. The rotation of the LPT rotor 122 also drives rotation of the propulsor rotor 118, which propels an outer stream of air outside of the engine housing 112 (e.g., via flowpath 30) thereby bypassing the engine core. The propulsion of the outer stream of air may account for a majority of thrust generated by the propulsion system 98, e.g., more than seventy-five percent (75%) of thrust. The propulsion system of the present disclosure, however, is not limited to the foregoing exemplary thrust ratio.

While the upstream airfoils 28A and/or the downstream airfoils 28B may be arranged at an exterior of an aircraft propulsion system and its gas turbine engine as described above, the upstream airfoils 28A and/or the downstream airfoils 28B may also or alternatively be arranged within an interior of an aircraft propulsion system and its gas turbine engine. The upstream airfoils 28A and/or the downstream airfoils 28B, for example, may alternatively be configured within a duct or ducts of a turbofan propulsion system or a turbojet propulsion system. The upstream airfoils 28A and/or the downstream airfoils 28B can also be included in various types of aircraft propulsion systems and gas turbine engines other than those described above.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   a plurality of upstream airfoils comprising a first upstream airfoil;
   a plurality of downstream airfoils arranged downstream of and adjacent the plurality of upstream airfoils, the plurality of downstream airfoils comprising a first downstream airfoil;
   a sensor arranged with the first upstream airfoil, the sensor configured to provide sensor data indicative of a parameter for the first upstream airfoil;
   an actuator coupled to the first downstream airfoil; and
   a controller configured to signal the actuator to move the first downstream airfoil based on the sensor data.

2. The assembly of claim 1, wherein the actuator is configured to pivot the first downstream airfoil about a pivot axis.

3. The assembly of claim 1, wherein the actuator is configured to change pitch of the first downstream airfoil.

4. The assembly of claim 1, wherein the controller is configured to signal the actuator to move the first downstream airfoil based on the sensor data to change aerodynamic loading on one or more of the plurality of upstream airfoils.

5. The assembly of claim 1, wherein the controller is configured to signal the actuator to move the first downstream airfoil based on the sensor data to reduce vibrations in one or more of the plurality of upstream airfoils.

6. The assembly of claim 1, wherein the parameter comprises a structural parameter of the first upstream airfoil.

7. The assembly of claim 1, further comprising:
   an upstream actuator coupled to the first upstream airfoil; and
   the controller further configured to signal the upstream actuator to move the first upstream airfoil based on the sensor data.

8. The assembly of claim 1, wherein the sensor is embedded within material of the first upstream airfoil.

9. The assembly of claim 8, wherein the material of the first upstream airfoil comprises fiber-reinforced composite material.

10. The assembly of claim 1, further comprising:
    a downstream sensor arranged with the first downstream airfoil, the downstream sensor configured to provide downstream sensor data indicative of a parameter for the first downstream airfoil;
    the controller configured to signal the actuator to move the first downstream airfoil based on the sensor data and the downstream sensor data.

11. The assembly of claim 1, further comprising:
    a rotor configured to rotate about a rotational axis;
    the rotor comprising the plurality of upstream airfoils.

12. The assembly of claim 11, wherein the rotor comprises an open propulsor rotor.

13. The assembly of claim 11, further comprising:
    an engine core comprising a combustor and a turbine fluidly coupled with and downstream of the combustor;
    the turbine comprising a turbine rotor configured to drive rotation of the rotor.

14. The assembly of claim 1, further comprising a stator vane array comprising the plurality of downstream airfoils.

15. The assembly of claim 14, wherein the stator vane array comprises an open stator vane array.

16. A propulsion system for an aircraft, comprising:
    an open rotor turbine engine including an array of open upstream airfoils and an array of open downstream airfoils adjacent and downstream of the array of open upstream airfoils along a flowpath;
    the array of open upstream airfoils comprising a first open upstream airfoil;
    the array of open downstream airfoils comprising a first open downstream airfoil; and
    a sensor system comprising an upstream sensor and a downstream sensor, the upstream sensor embedded within fiber-reinforced composite material of the first open upstream airfoil, and the downstream sensor embedded within fiber-reinforced composite material of the first open downstream airfoil.

17. The propulsion system of claim 16, wherein the open rotor turbine engine further includes
    an open propulsor rotor comprising the array of open upstream airfoils; and
    an open stator vane array comprising the array of open downstream airfoils.

18. The propulsion system of claim 16, wherein
    the upstream sensor is configured to provide upstream sensor data indicative of a structural parameter of the first open upstream airfoil;
    the downstream sensor is configured to provide downstream sensor data indicative of a structural parameter of the first open downstream airfoil; and
    the sensor system is configured to process the upstream sensor data and the downstream sensor data to determine presence of an anomaly.

19. The propulsion system of claim 16, further comprising an actuation system configured to change pitch of at least one of the first open upstream airfoil or the first open downstream airfoil based on sensor data from at least one of the upstream sensor or the downstream sensor.

20. A method, comprising:
    providing a gas turbine engine including a plurality of upstream airfoils and a plurality of downstream airfoils adjacent and downstream of the plurality of upstream airfoils along a flowpath, the plurality of upstream airfoils comprising a first upstream airfoil, and the plurality of downstream airfoils comprising a first downstream airfoil;
    outputting sensor data from a sensor embedded within the first upstream airfoil, the sensor data indicative of a structural parameter for the first upstream airfoil; and
    adjusting pitch of the first downstream airfoil based on the sensor data.

* * * * *